(12) United States Patent
MacArthur et al.

(10) Patent No.: US 10,363,639 B2
(45) Date of Patent: Jul. 30, 2019

(54) LIFTING DEVICES AND METHODS OF OPERATING THE SAME

(71) Applicants: Benjamin Barton MacArthur, Barrie (CA); Sasha Begovic, Etobicoke (CA); Robert Johan Mogensen, Mulmur (CA)

(72) Inventors: Benjamin Barton MacArthur, Barrie (CA); Sasha Begovic, Etobicoke (CA); Robert Johan Mogensen, Mulmur (CA)

(73) Assignee: Honda Motor Co., Ltd., Tokyo (JP)

( * ) Notice: Subject to any disclaimer, the term of this patent is extended or adjusted under 35 U.S.C. 154(b) by 639 days.

(21) Appl. No.: 14/921,583

(22) Filed: Oct. 23, 2015

(65) Prior Publication Data

US 2017/0113310 A1    Apr. 27, 2017

(51) Int. Cl.
*G06F 7/00* (2006.01)
*B23P 21/00* (2006.01)

(52) U.S. Cl.
CPC ......... *B23P 21/004* (2013.01); *B23P 2700/50* (2013.01)

(58) Field of Classification Search
None
See application file for complete search history.

(56) References Cited

U.S. PATENT DOCUMENTS

| 4,534,546 A | 8/1985 | Cattani |
| 4,805,299 A | 2/1989 | Sekimoto et al. |
| 4,894,909 A | 1/1990 | Sakamoto et al. |
| 4,896,086 A | 1/1990 | Miyahara et al. |
| 4,998,050 A * | 3/1991 | Nishiyama ............ B25J 9/1666 318/567 |
| 5,203,073 A * | 4/1993 | Kotake .................. B62D 65/02 29/771 |
| 5,239,739 A * | 8/1993 | Akeel .................. B23K 37/047 29/430 |
| 5,910,894 A * | 6/1999 | Pryor ............... G05B 19/41875 219/121.64 |
| 5,911,301 A * | 6/1999 | Ozawa .................. B23P 19/086 198/345.3 |
| 6,183,188 B1 | 2/2001 | Randazzo et al. |
| 7,185,774 B2 | 3/2007 | Colgate et al. |
| 8,651,358 B2 | 2/2014 | Kilibarda |
| 8,985,354 B2 | 3/2015 | Lecours et al. |
| 9,032,609 B2 | 5/2015 | Kilibarda |

(Continued)

FOREIGN PATENT DOCUMENTS

JP    4407873 A    2/2010

*Primary Examiner* — Yolanda R Cumbess
(74) *Attorney, Agent, or Firm* — Armstrong Teasdale LLP

(57) ABSTRACT

A lifting device for transporting a component from a first position to a second position is provided. The second position is defined relative to a destination datum feature. The lifting device includes a computing device and an arm having a clamp mechanism and a locator mechanism. The arm is selectively movable to engage the component, removably couple the component to the arm using the clamp mechanism, and facilitate transport of the component to the second position. The locator mechanism includes a datum feature that interacts with the destination datum feature to transmit a signal to the computing device to indicate the component is at the second position.

16 Claims, 4 Drawing Sheets

(56) References Cited

U.S. PATENT DOCUMENTS

| | | | |
|---|---|---|---|
| 2006/0283687 A1* | 12/2006 | Heinemeier | B62D 65/18 198/345.3 |
| 2007/0116550 A1* | 5/2007 | Nakamura | B62D 5/003 414/797 |
| 2010/0199571 A1* | 8/2010 | Bush | B60R 13/02 49/502 |
| 2012/0217129 A1* | 8/2012 | Tsutsumi | B23P 21/004 198/341.07 |
| 2015/0001186 A1* | 1/2015 | Ryu | B25J 15/0066 219/86.24 |
| 2015/0118003 A1* | 4/2015 | Bacalia | B25J 9/1682 414/771 |
| 2015/0336271 A1* | 11/2015 | Spicer | B25J 9/1697 428/195.1 |
| 2016/0059419 A1* | 3/2016 | Suzuki | B25J 9/1697 700/114 |
| 2016/0288331 A1* | 10/2016 | Sivich | B25J 9/1697 |

* cited by examiner

LIFTING DEVICES AND METHODS OF OPERATING THE SAME

BACKGROUND

The present disclosure relates generally to lifting devices and, more particularly, to a lifting device that facilitates precise positioning of components during assembly.

Many known products (e.g., automobiles) are assembled in a progressive manner on an assembly line, along which a subassembly of the product moves from one workstation to next. At some workstations, operators utilize mechanized lifting devices for assistance in lifting and/or positioning heavier components on the subassembly. The heavier components are often manually coupled to the subassembly, or otherwise adjusted, by the operators after having been positioned on the subassembly.

Accurate positioning of components is typically required to ensure proper assembly and functionality of the products. However, it may be challenging for the operators to accurately, and repeatedly, position the heavier components onto the subassemblies using known lifting devices. It would be useful, therefore, to provide a mechanized lifting device which facilitates precise positioning of components during assembly.

BRIEF SUMMARY

In one aspect, a lifting device for transporting a component from a first position to a second position is provided. The second position is defined relative to a destination datum feature. The lifting device includes a computing device and an arm having a clamp mechanism and a locator mechanism. The arm is selectively movable to engage the component, removably couple the component to the arm using the clamp mechanism, and facilitate transport of the component to the second position. The locator mechanism includes a datum feature that interacts with the destination datum feature to transmit a signal to the computing device to indicate the component is at the second position.

In another aspect, a method of operating a lifting device is provided. The method includes engaging a component using a clamp mechanism of the lifting device and positioning the engaged component on a pallet using a locator mechanism of the lifting device such that, when a datum feature of the locator mechanism interacts with a destination datum feature of the pallet, the datum feature of the locator mechanism transmits a signal to a computing device of the lifting device to indicate proper positioning of the engaged component on the pallet.

In yet another aspect, a locator system for a lifting device is provided. The lifting device has a computing device and facilitates transporting a component from a first position to a second position defined relative to a destination datum feature. The locator system includes a base and a datum feature coupled to the base. The datum feature of the locator system is oriented to interact with the destination datum feature to transmit a signal to the computing device to indicate the component is at the second position.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The present disclosure relates generally to lifting devices and, more particularly, to lifting devices that facilitate precise positioning of components during assembly. In the exemplary embodiment, a lifting device includes a locator mechanism that automatically recognizes accurate positioning of a component on a subassembly, and that enables the component to be released from the lifting device only after accurate positioning on the subassembly has been achieved. The exemplary locator mechanism is retractable to enable the lifting device to engage each component without interfering with the fixture on which the component is mounted. Moreover, the locator mechanism is protractible only after the component has been engaged to facilitate accurate positioning of the component on the subassembly, after which the locator mechanism is again retractable to facilitate engaging and positioning another component onto another subassembly. As such, the positioning of components during assembly is quicker, easier, safer, and more precise using the lifting device described herein as compared to known devices.

As used herein, an element or step recited in the singular and preceded with the word "a" or "an" should be understood as not excluding plural elements or steps unless such exclusion is explicitly recited. Moreover, references to "one embodiment" and/or the "exemplary embodiment" are not intended to be interpreted as excluding the existence of additional embodiments that also incorporate the recited features.

Figure 1:
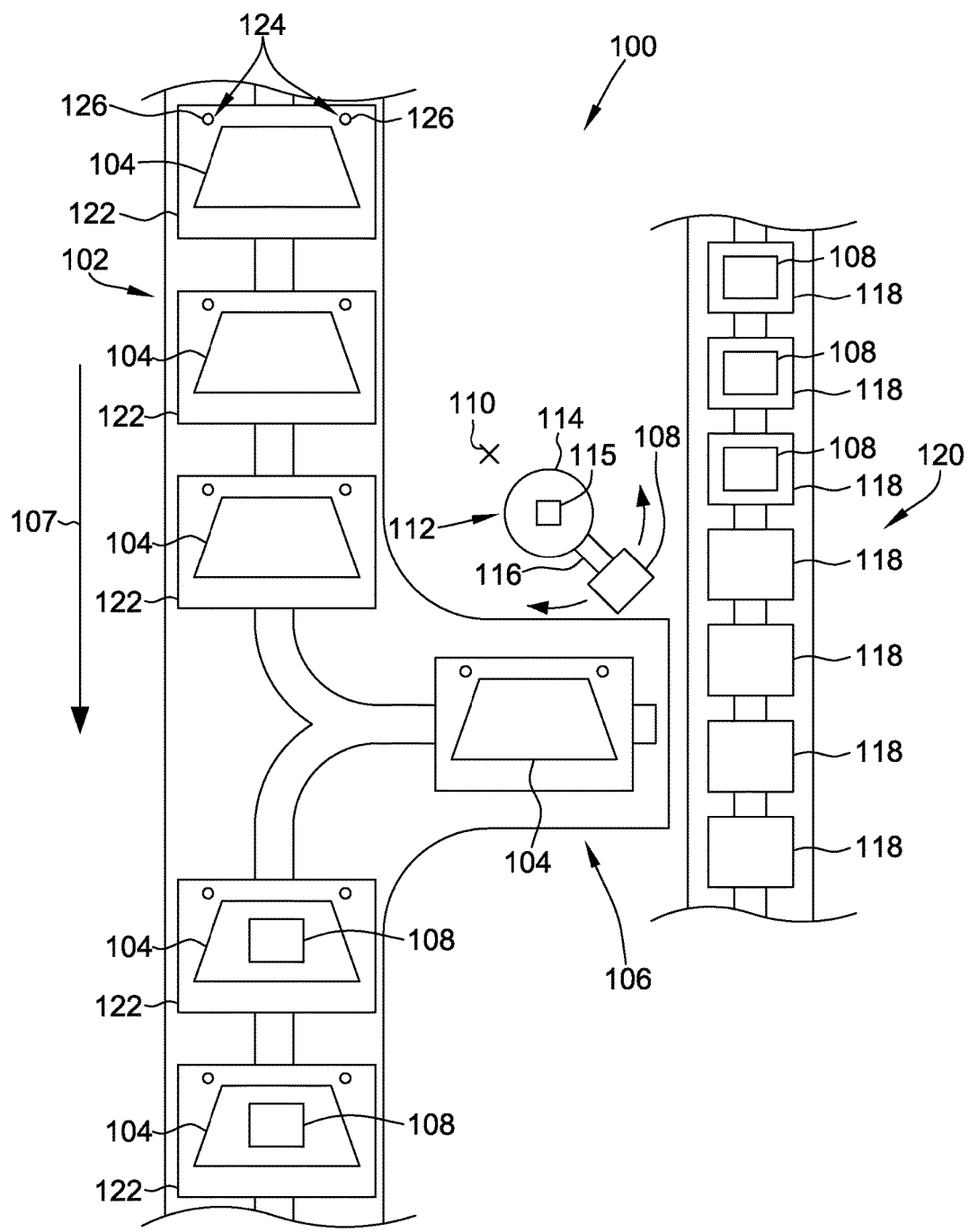
FIG. 1 is a schematic illustration of an exemplary assembly system.

FIG. 1 is a schematic illustration of an exemplary assembly system 100 for use in assembling a product (e.g., an automobile). In the exemplary embodiment, system 100 includes a conveyor 102 by which components (e.g., subassemblies 104) of the product (e.g., frames of the automobile) may be transported to and from a workstation 106 generally in an assembly direction 107. At workstation 106, a component 108 of the product (e.g., a rear suspension of the automobile) is mounted on each subassembly 104 by an operator 110 using a lifting device 112 including a base 114 and an arm 116 coupled to base 114. As set forth in more detail below, operator 110 operates lifting device 112 to selectively remove each component 108 from a fixture 118 on which component 108 is supported during transport to workstation 106. In some embodiments, lifting device 112 is a lift assist, that is, a machine that supports the weight of component 108 while allowing operator 110 to physically move component 108 to a desired location. Fixture 118 may, in one embodiment, be a component of the dunnage by which component 108 was transported to the site of system 100. Although each component 108 and respective fixture 118 are illustrated as being transported to workstation 106 via a conveyor 120, it is contemplated that components 108 and fixtures 118 may be transported to workstation 106 in any suitable manner (e.g., each component 108 and fixture 118 may instead be transported to workstation 106 on a cart). In other embodiments, each subassembly 104 and component 108 may be transported to workstation 106 in any other suitable manner that facilitates enabling lifting device 112 to function as described herein.

In the exemplary embodiment, each subassembly 104 is mounted on a pallet 122 that is movable along conveyor 102. Each pallet 122 includes at least one location feature 124 that facilitates properly locating subassembly 104 relative to pallet 122. Because each pallet 122 is the same size and because location feature(s) 124 are positioned in the same location on each pallet 122, the location of each subassembly 104 on its respective pallet 122 is consistent from one pallet 122 to the next. As set forth in more detail below, arm 116 of lifting device 112 is maneuverable to lift and accurately position each component 108 on a respective subassembly 104 using location feature(s) 124. In the exemplary embodiment, each pallet 122 includes two such location features 124 in the form of destination datum features (e.g., datum pins 126) that are spaced apart from one another on opposite sides of pallet 122 and, hence, on opposite sides of subassembly 104. In other embodiments, each pallet 122 may have any suitable quantity of location feature(s) 124 arranged in any suitable manner that facilitates enabling lifting device 112 to function as described herein.

Figure 2:
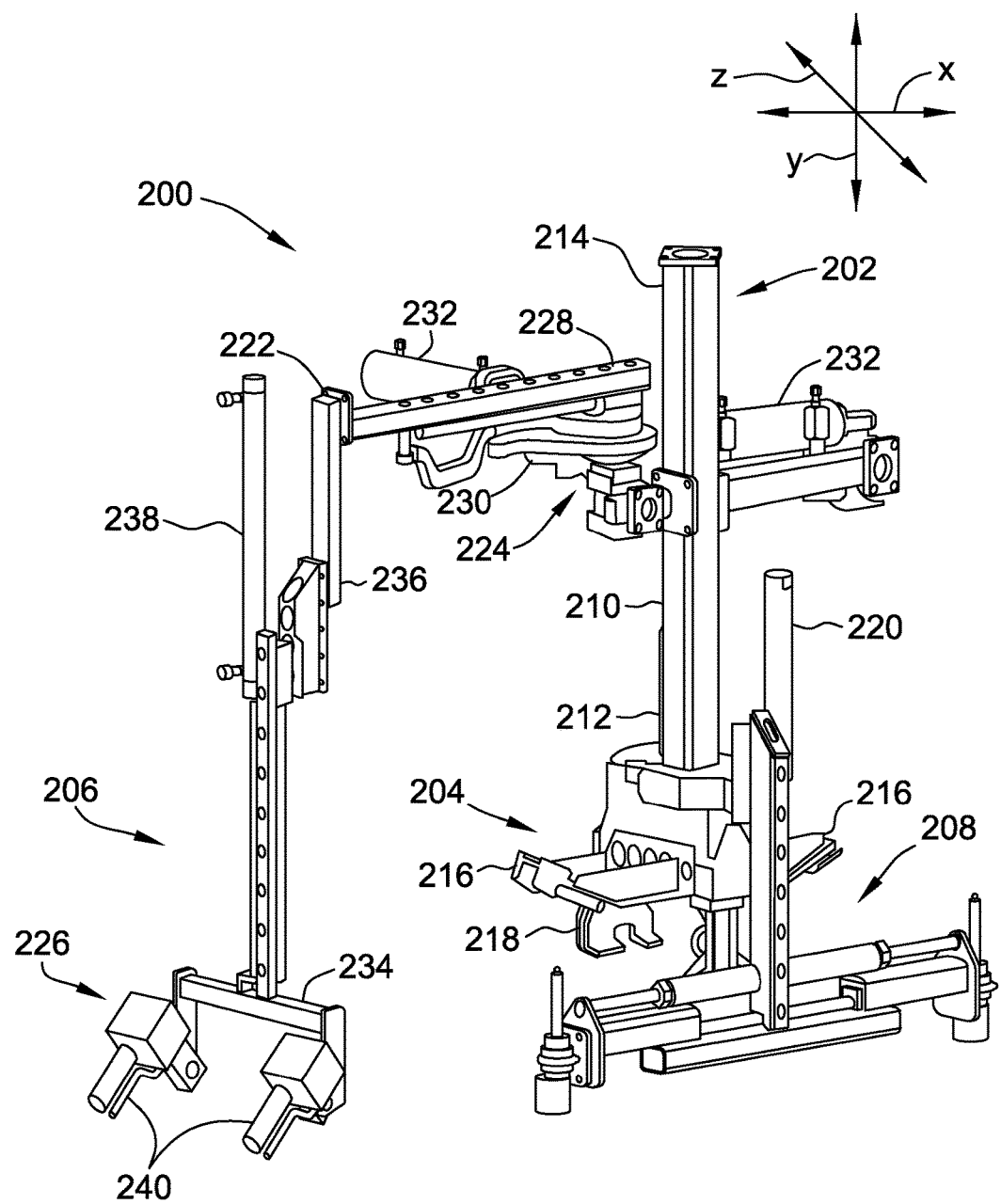
FIG. 2 is a perspective view of an arm of an exemplary lifting device of the assembly system shown in FIG. 1.

FIG. 2 is a perspective view of an exemplary arm 200 that may be used with lifting device 112. In the exemplary embodiment, base 114 is supported by, i.e. mounted to, the ground, and each arm 200 is coupled to base 114 such that arm 200 is maneuverable in a three-dimensional space defined by an X-axis, a Y-axis, and a Z-axis which are oriented perpendicularly to one another. As such, in the exemplary embodiment, the X-axis and the Z-axis define a plane oriented substantially parallel to the ground. Similarly, the X-axis and the Y-axis, and the Z-axis and the Y-axis, define planes that are oriented substantially perpendicularly to the ground. Alternatively, base 114 may be mounted to any suitable support structure, and lifting device 112 may include a plurality of arms 200 that are maneuverable relative to one another and/or to base 114 in any suitable manner that facilitates enabling lifting device 112 to function as described herein.

Each arm 200 includes a frame 202 to which a clamp mechanism 204, an operator mechanism 206, and a locator mechanism 208 are coupled. In the exemplary embodiment, frame 202 includes a column 210 that is suspended above, and that is oriented substantially perpendicular to the ground, such that column 210 has a lower end 212 and an upper end 214. Clamp mechanism 204 is coupled to column 210 at lower end 212, and clamp mechanism 204 includes a pair of opposing and stationary contact plates 216 and a pair of movable fingers 218 that also oppose one another, although only one such finger 218 is shown in FIG. 2. Locator mechanism 208 is slidably coupled to column 210 at lower end 212 adjacent to clamp mechanism 204 via a linear actuator (e.g., a pneumatic cylinder 220 in the exemplary embodiment). Operator mechanism 206 is coupled to column 210 between lower end 212 and upper end 214, and in the exemplary embodiment, operator mechanism 206 includes a bracket 222, a pivot apparatus 224, and an operator interface 226. Bracket 222 has a proximal end 228 that is coupled to column 210 at pivot apparatus 224, and pivot apparatus 224 includes a plurality of levers 230 that are movable under the influence of a rotary actuator and/or via a plurality of linear actuators (e.g., a pair of pneumatic cylinders 232 oriented substantially perpendicularly to one another). Operator interface 226 includes a handlebar 234 that is slidably coupled to a distal end 236 of bracket 222 via a linear actuator (e.g., a pneumatic cylinder 238 in the exemplary embodiment). In other embodiments, arm 200 may have any suitable mechanism in lieu of, or in addition to, clamp mechanism 204 for engaging and lifting component 108 (e.g., in place of clamp mechanism 204, arm 200 may instead have a clip, a hook, a magnet, and/or a fork that facilitates engaging component 108 and positioning component 108 on subassembly 104 in the manner set forth herein). Alternatively, clamp mechanism 204 and operator mechanism 206 of arm 200 may be configured in any suitable manner that facilitates enabling them to function as described herein.

In the exemplary embodiment, arm 200 is at least in part manually maneuverable in the three-dimensional space defined by the X-axis, the Y-axis, and the Z-axis using a computing device 115 (shown in FIG. 1) that is communicatively coupled to operator mechanism 206. For example, in the exemplary embodiment, handlebar 234 has a pair of control grips 240 that are communicatively coupled to computing device 115 for use in manually maneuvering arm 200. Notably, in the exemplary embodiment, arm 200 is at least in part maneuverable automatically (i.e., without the instruction or assistance of operator 110) in the three-dimensional space defined by the X-axis, the Y-axis, and the Z-axis using computing device 115. As such, to perform the assembly operations set forth in more detail below, arm 200 is manually and/or automatically maneuverable in at least one of the following ways: (a) by displacing clamp mechanism 204, operator mechanism 206, locator mechanism 208, and column 210 in unison along the X-axis, the Y-axis, and/or the Z-axis; (b) by rotating, via pivot apparatus 224, column 210 (and, therefore, clamp mechanism 204 and locator mechanism 208) relative to operator mechanism 206 in the plane defined by the X-axis and the Z-axis; (c) by raising and/or lowering handlebar 234 relative to bracket 222 (and, therefore, relative to column 210, clamp mechanism 204, and locator mechanism 208) such that handlebar 234 moves substantially perpendicularly to the plane defined by the X-axis and the Z-axis (and, therefore, moves substantially perpendicularly to the ground); and/or (d) by protracting locator mechanism 208 (e.g., moving locator mechanism 208 downwardly relative to column 210 and/or clamp mechanism 204) and/or retracting locator mechanism 208 (e.g., moving locator mechanism 208 upwardly relative to column 210 and/or clamp mechanism 204) such that locator mechanism 208 is movable substantially perpendicularly to the plane defined by the X-axis and the Z-axis and, therefore, is movable substantially perpendicularly to the ground. Alternatively, arm 200 may be configured in any suitable manner that facilitates enabling arm 200 to function as described herein.

Figure 3:
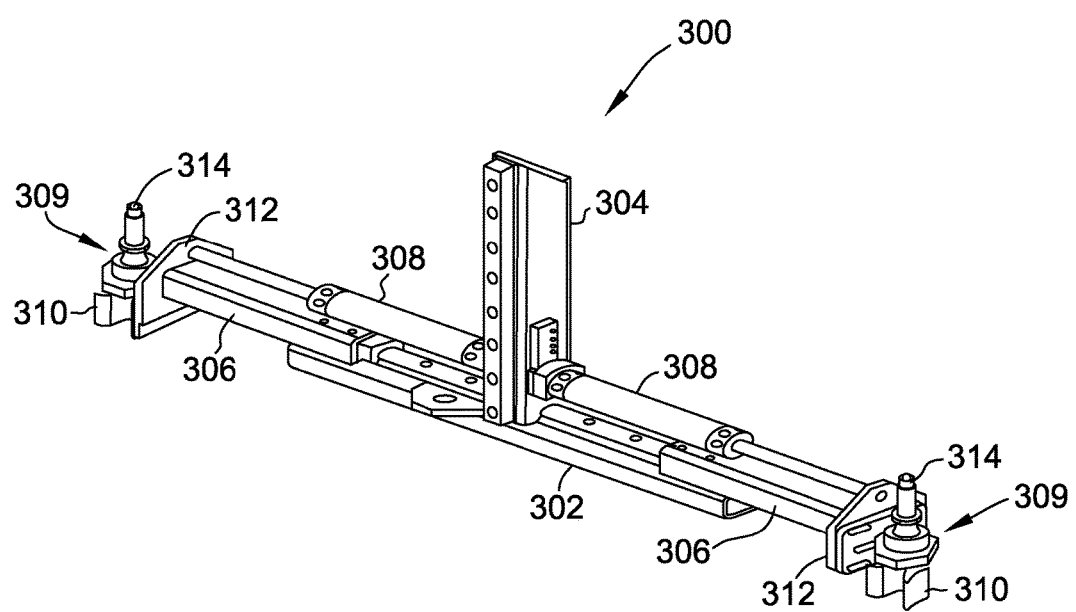
FIG. 3 is a perspective view of an exemplary locator mechanism of the arm shown in FIG. 2.

FIG. 3 is a perspective view of an exemplary locator mechanism 300 for use with arm 200. In the exemplary embodiment, locator mechanism 300 includes a base 302 and a stem 304 that extends substantially perpendicularly to base 302, such that base 302 and stem 304 collectively define a substantially inverted T-shaped profile. Locator mechanism 300 also includes a pair of arms 306, each of which is slidable along base 302 on opposite sides of stem 304 via a linear actuator (e.g., a pneumatic cylinder 308). Each arm 306 includes at least one datum feature 309 configured to interact with datum feature(s) 124 of pallet 122 to facilitate proper positioning of components 108 on subassemblies 104, as set forth in more detail below. In the exemplary embodiment, each arm 306 includes two such datum features 309 in the form of datum sleeves 310 that are each positioned at a distal end 312 of one arm 306 and coupled to a datum sensor 314 (e.g., a datum switch). As such, pneumatic cylinders 308 are operable to selectively adjust (e.g., translate) arms 306 along base 302 to protract datum sleeves 310 (e.g., to cause datum sleeves 310 to move outwardly away from stem 304) and to retract datum sleeves 310 (e.g., to cause datum sleeves 310 to move inwardly towards stem 304) as desired, thereby selectively increasing and decreasing the spacing defined between datum sleeves 310. In other embodiments, locator mechanism 300 may have any suitable quantity of datum features (e.g., datum pins, rather than datum sleeves 310 and sensors 314) that are adjustably coupled to any suitable structure in any suitable manner that facilitates enabling locator mechanism 300 to function as described herein. Notably, locator mechanism 300 (and locator mechanism 208) is a locator system that can be incorporated into newly fabricated (e.g., unused) lifting devices in some embodiments, and can be added onto prefabricated (e.g., already-in-use) lifting devices in other embodiments as a retrofit option. Also, locator mechanism 300 (and locator mechanism 208) is usable on lifting devices for placement of a component (e.g., component 108 and/or subassembly 104) onto a pallet, and is usable on lifting devices for direct placement of a component (e.g., component 108) onto another component (e.g., subassembly 104) with or without the use of a pallet (e.g., the destination datum feature(s) described above may be located on any suitable structure and are not restricted to use on a pallet).

Figure 4:
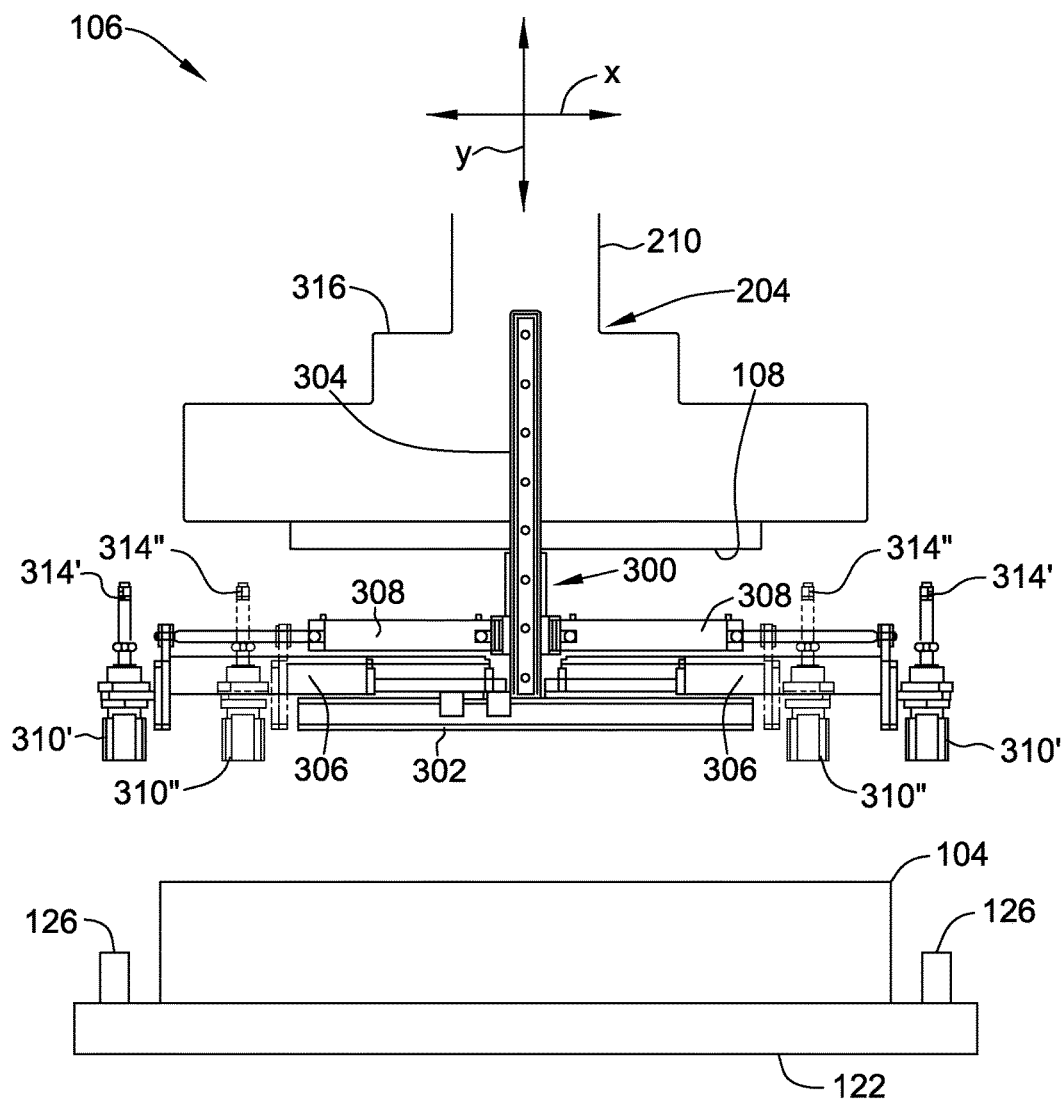
FIG. 4 is a schematic illustration of the locator mechanism shown in FIG. 3 when the lifting device shown in FIG. 2 is operated in the assembly system shown in FIG. 1.

FIG. 4 is a schematic illustration of locator mechanism 300 used on arm 200 of lifting device 112 as lifting device 112 is operated in assembly system 100. In the exemplary embodiment, locator mechanism 300 is coupled to column 210 so as to be protractible (or movable downwardly away from column 210) and retractable (or movable upwardly towards column 210) along the Y-axis. With arms 306 of locator mechanism 300 also being protractible (or movable outwardly) and retractable (or movable inwardly) along the X-axis as set forth above, datum sleeves 310 are effectively movable substantially parallel and substantially perpendicularly to the ground (i.e., along both the X-axis and the Y-axis).

FIG. 4 illustrates an operating state of lifting device 112 in which, by manually operating lifting device 112 at workstation 106 to maneuver arm 200 in the manner set forth above using grips 240, operator 110 has already engaged and lifted a component 108 from its fixture 118 using clamp mechanism 204. Operator 110 has also positioned component 108 above a subassembly 104, which is mounted on its respective pallet 122 on conveyor 102. However, operator 110 has yet to position component 108 on subassembly 104. Notably, after operator 110 had already engaged component 108, and while operator 110 was lifting component 108 from fixture 118 and/or positioning component 108 above subassembly 104, computing device 115 automatically: (a) protracted locator mechanism 300 (e.g., moved locator mechanism 300 downwardly relative to column 210) along the Y-axis; and (b) protracted arms 306 of locator mechanism 300 (e.g., moved arms 306 outwardly relative to stem 304) along the X-axis such that datum sleeves 310 and sensors 314 moved from their retracted positions (as indicated by reference numerals 310" and 314") to their protracted positions (as indicated by reference numerals 310' and 314') along the X-axis. Protracted as such, locator mechanism 300 is thus said to be in an "unload" state.

With component 108 positioned above subassembly 104 and datum sleeves 310 protracted along the X-axis and the Y-axis as illustrated in FIG. 4, operator 110 then visually aligns datum sleeves 310 with datum pins 126 of pallet 122 along the X-axis and lowers column 210 (and, hence, locator mechanism 300, clamp mechanism 204, and component 108) toward subassembly 104 using grips 240. Once datum pins 126 are inserted into the datum sleeves 310, sensors 314 transmit a signal indicative of proper positioning to computing device 115. Computing device 115 in turn illuminates at least one light on handlebar 234 or on locator mechanism 300 (e.g., on sensor(s) 314), thereby indicating to operator 110 that proper positioning has been achieved. Computing device 115 then unlocks clamp mechanism 204 and permits operator 110 to release component 108 onto subassembly 104. Notably, computing device 115 maintains the lock activated and prevents the release of component 108 by operator 110 until proper positioning has been verified (e.g., until computing device 115 receives a signal from sensors 314 indicating that datum pins 126 have been inserted into datum sleeves 310).

After properly positioning component 108 on subassembly 104, operator 110 can then maneuver arm 200 away from subassembly 104 to remove datum pins 126 from datum sleeves 310 and reengage another component 108 for positioning on another subassembly 104 which arrives at workstation 106 on another pallet 122 via conveyor 102. While operator 110 is maneuvering arm 200 in this manner, computing device 115 automatically: (A) retracts arms 306 (e.g., moves arms 306 inwardly relative to stem 304) along the X-axis such that datum sleeves 310 and sensors 314 move from their protracted positions (as indicated by reference numerals 310' and 314') to their retracted positions (as indicated by reference numerals 310" and 314"); and (B) refracts locator mechanism 300 (e.g., moves locator mechanism 300 upwardly relative to column 210) along the Y-axis. As such, computing device 115 automatically repositions locator mechanism 300 such that, when viewed from the side elevation of FIG. 4, locator mechanism 300 is entirely contained within the footprint 316 of clamp mechanism 304 to facilitate preventing locator mechanism 300 from interfering with fixture 118 when engaging and lifting the next component 108 for positioning on another subassembly 104. Refracted as such, locator mechanism 300 is thus said to be in a "load" state.

The above-described embodiments include at least the following technical effects: (1) providing a lifting device with a locator mechanism that automatically and continuously transitions between a protracted "unload" state and a retracted "load" state while the lifting device is operated by an operator to repeatedly lift and position components in an assembly system; (2) providing a lifting device with a locator mechanism that automatically recognizes accurate positioning of a component on a subassembly, and that enables the component to be released from the lifting device only after accurate positioning on the subassembly has been achieved; (3) providing a lifting device with a locator mechanism that is retractable to enable the lifting device to engage each component without interfering with the fixture on which the component is mounted, and is protractible only after the component has been engaged to facilitate accurate positioning of the component on the subassembly, after which the locator mechanism is again retractable to facilitate engaging and positioning another component onto another subassembly; and (4) providing a lifting device which identifies proper positioning of a component on a subassembly, prevents an operator from releasing the component until proper positioning is achieved, and provides an indication of proper positioning to the operator after proper positioning has been achieved. As such, the embodiments facilitate the accurate positioning of components during assembly in a manner that is quicker, easier, safer, and more precise than known methods.

The methods and systems described herein facilitate accurately and repeatedly positioning components. For example, the methods and systems described herein facilitate assembling a product (e.g., an automobile) by providing assistance to an operator in lifting and precisely positioning heavier components (e.g., the rear suspension assembly of the automobile) on a subassembly (e.g., the frame of the automobile). The methods and systems thereby facilitate less interruption to the operator, which reduces process time and improves safety. Thus, the methods and systems described herein facilitate efficient production overall.

Exemplary embodiments of lifting devices and methods of operating the same are described above in detail. The systems and methods are not limited to the specific embodiments described herein, but rather, components of the systems and/or steps of the methods may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

Some embodiments involve the use of one or more electronic or computing devices. Such devices typically include a controller or processing device such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by the controller or processing device, cause the controller or processing device to perform at least a portion of the methods described herein. The above examples are exemplary only, and thus are not intended to limit in any way the definition and/or meaning of the terms controller and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lifting device for transporting a component from a first position to a second position, wherein the second position is defined relative to a destination datum feature including at least one datum pin, said lifting device comprising:
   a computing device; and
   an arm comprising a clamp mechanism and a locator mechanism, said arm selectively movable to engage the component, removably couple the component to said arm using said clamp mechanism, and facilitate transport of the component to the second position, said locator mechanism comprising a selectively retractable datum feature that contacts the destination datum feature to transmit a signal to said computing device to indicate the component is at the second position, wherein said datum feature comprises a datum sleeve sized to receive one of the at least one datum pins therein.

2. The lifting device of claim 1 wherein said datum feature of said locator mechanism is automatically retractable by said computing device.

3. The lifting device of claim 2 wherein said datum feature of said locator mechanism is automatically protractible by said computing device.

4. The lifting device of claim 1 wherein said locator mechanism comprises a pair of spaced-apart datum sleeves each sized to receive one of the at least one datum pins.

5. The lifting device of claim 1 wherein said computing device is programmed to lock said clamp mechanism to prevent release of the component until a transmitted signal is received at said computing device from said datum feature of said locator mechanism.

6. The lifting device of claim 1 wherein said datum feature of said locator mechanism is selectively retracted until said clamp mechanism engages the component, and is selectively protracted to contact the destination datum feature.

7. A method of operating a lifting device, said method comprising:
   engaging a component using a clamp mechanism of the lifting device; and
   selectively protracting a locator mechanism of the lifting device such that a datum feature of the locator mechanism contacts a destination datum feature of a pallet to properly position the engaged component on the pallet, wherein the destination datum feature of the pallet includes at least one datum pin and the datum feature of the locator mechanism includes a datum sleeve, said method further comprising inserting one of the at least one datum pins into the datum sleeve when positioning the engaged component on the pallet,
   wherein, when the datum sleeve receives the datum pin, the locator mechanism transmits a signal to a computing device of the lifting device to indicate proper positioning of the engaged component on the pallet.

8. The method of claim 7 further comprising automatically protracting the datum feature of the locator mechanism using the computing device.

9. The method of claim 8 further comprising automatically retracting the datum feature of the locator mechanism after positioning the engaged component on the pallet.

10. The method of claim 7 further comprising locking the clamp mechanism using the computing device until a transmitted signal is received at the computing device from the datum feature of the locator mechanism.

11. The method of claim 7, wherein the datum pin includes a pair of spaced-apart datum pins and the datum sleeve includes a pair of spaced-apart datum sleeves, said method further comprising inserting the pair of spaced-apart datum pins of the pallet into the pair of spaced-apart datum sleeves of the locator mechanism when positioning the engaged component on the pallet.

12. A locator system for a lifting device, wherein the lifting device has a computing device and facilitates transporting a component from a first position to a second position defined relative to a destination datum feature including at least one datum pin, said locator system comprising:
- a base; and
- a selectively retractable datum feature coupled to said base, wherein said datum feature of said locator system is oriented to contact the destination datum feature to transmit a signal to the computing device to indicate the component is at the second position wherein said datum feature comprises a datum sleeve sized to receive one of the at least one datum pins therein.

13. The locator system of claim 12 wherein said datum feature of said locator system is automatically retractable by the computing device.

14. The locator system of claim 13 wherein said datum feature of said locator system is automatically protractible by the computing device.

15. The locator system of claim 12 wherein said locator system comprises a pair of spaced-apart datum sleeves each sized to receive a corresponding one of the at least one datum pins.

16. The locator system of claim 12 wherein said datum feature of said locator system is selectively retracted until the lifting device engages the component, and is selectively protracted to contact the destination datum feature.

* * * * *